(12) United States Patent  (10) Patent No.: US 8,223,587 B2
Krebs et al.                 (45) Date of Patent:     Jul. 17, 2012

(54) FULL WAVEFIELD INVERSION USING TIME VARYING FILTERS

(75) Inventors: Jerome R. Krebs, Houston, TX (US); John E. Anderson, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 31 days.

(21) Appl. No.: 13/020,502

(22) Filed: Feb. 3, 2011

(65) Prior Publication Data

US 2011/0238390 A1  Sep. 29, 2011

Related U.S. Application Data

(60) Provisional application No. 61/318,561, filed on Mar. 29, 2010.

(51) Int. Cl.
   *G01V 1/00* (2006.01)
   *G06F 17/20* (2006.01)
(52) U.S. Cl. .......................................... 367/43; 708/320
(58) Field of Classification Search .............. 367/43–46, 367/73; 708/300–323
   See application file for complete search history.

(56) References Cited

U.S. PATENT DOCUMENTS

| | | |
|---|---|---|
| 3,812,457 A | 5/1974 | Weller |
| 3,864,667 A | 2/1975 | Bahjat |
| 4,159,463 A | 6/1979 | Silverman |
| 4,168,485 A | 9/1979 | Payton et al. |
| 4,545,039 A | 10/1985 | Savit |
| 4,562,540 A | 12/1985 | Devaney |
| 4,575,830 A | 3/1986 | Ingram et al. |
| 4,594,662 A | 6/1986 | Devaney |
| 4,636,956 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |

(Continued)

FOREIGN PATENT DOCUMENTS

EP    1 094 338    4/2001

(Continued)

OTHER PUBLICATIONS

Dai, W. et al. (2010), "3D Multi-source Least-squares Reverse Time Migration," SEG Denver 2010 Annual Meeting, pp. 3120-3124.

(Continued)

*Primary Examiner* — Jack W Keith
*Assistant Examiner* — Krystine Breier
(74) *Attorney, Agent, or Firm* — ExxonMobil Upstream Research Company

(57) ABSTRACT

An improved method for reducing the accuracy requirements on the starting model when performing multi-scale inversion of seismic data (65) by local objective function optimization (64). The different scales of inversion are brought about by incorporating a low-pass filter into the objective function (61), and then decreasing the amount of high-frequency data that is filtered out from one scale to the next. Moreover, the filter is designed to be time varying, wherein the filter's low-pass cutoff frequency decreases with increasing traveltime of the seismic data being filtered (62). The filter may be designed using Pratt's criterion for eliminating local minima, and performing averages (or other statistical measure) of the period and the traveltime error only with respect to source and receiver location but not traveltime (63).

23 Claims, 3 Drawing Sheets

U.S. PATENT DOCUMENTS

| | | |
|---|---|---|
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,828 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,901,333 B2 | 5/2005 | Van Riel et al. |
| 6,903,999 B2 | 6/2005 | Curtis et al. |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenhoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 * | 7/2008 | Langlais et al. ............. 702/14 |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,620,534 B2 | 11/2009 | Pita et al. |
| 7,646,924 B2 | 1/2010 | Donoho |
| 7,672,194 B2 | 3/2010 | Jeffryes |
| 7,675,815 B2 | 3/2010 | Saenger et al. |
| 7,679,990 B2 | 3/2010 | Herkenhoff et al. |
| 7,715,985 B2 | 5/2010 | Van Manen et al. |
| 7,725,266 B2 | 5/2010 | Sirgue et al. |
| 7,835,072 B2 | 11/2010 | Izumi |
| 7,840,625 B2 | 11/2010 | Candes et al. |
| 2002/0120429 A1 | 8/2002 | Ortoleva |
| 2002/0183980 A1 | 12/2002 | Guillaume |
| 2004/0199330 A1 | 10/2004 | Routh et al. |
| 2006/0235666 A1 | 10/2006 | Assa et al. |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0070042 A1 | 3/2009 | Birchwood et al. |
| 2009/0164186 A1 | 6/2009 | Haase et al. |
| 2009/0248308 A1 | 10/2009 | Luling |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0142316 A1 | 6/2010 | Keers et al. |

FOREIGN PATENT DOCUMENTS

| | | |
|---|---|---|
| EP | 1 746 443 | 1/2007 |
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |

OTHER PUBLICATIONS

Delprat-Jannuad, F. et al. (2005), "A fundamental limitation for the reconstruction of impedance profiles from seismic data," *Geophysics* 70(1), pp. R1-R14.

Dunkin, J.W. et al. (1973), "Effect of Normal Moveout on a Seismic Pluse," *Geophysics* 38(4), pp. 635-642.

Igel, H. et al. (1996), "Waveform inversion of marine reflection seismograms for P impedance and Poisson's ratio," *Geophys. J. Int.* 124i, pp. 363-371.

Lancaster, S. et al. (2000), "Fast-track 'colored' inversion," 70th SEG Ann. Meeting, *Expanded Abstracts*, pp. 1572-1575.

Lazaratos, S. et al. (2009), "Inversion of Pre-migration Spectral Shaping," 2009 SEG Houston Int'l. Expo. & Ann. Meeting, *Expanded Abstracts*, pp. 2383-2387.

Lazaratos, S. (2006), "Spectral Shaping Inversion for Elastic and Rock Property Estimation," *Research Disclosure*, Issue 511, pp. 1453-1459.

Moghaddam, P.P. et al. (2010), "Randomized full-waveform inversion: a dimenstionality-reduction approach," 80th SEG Ann. Meeting, *Expanded Abstracts*, pp. 977-982.

Ostmo, S. et al. (2002), "Finite-difference iterative migration by linearized waveform inversion in the frequency domain," SEG Int'l. Expo. & 72nd Ann. Meeting, 4 pgs.

Pica, A. et al. (2005), "3D Surface-Related Multiple Modeling, Principles and Results," 2005 SEG Ann. Meeting, *SEG Expanded Abstracts* 24, pp. 2080-2083.

Rawlinson, N. et al. (2008), "A dynamic objective function technique for generating multiple solution models in seismic tomography," *Geophys. J. Int.* 178, pp. 295-308.

Shih, R-C. et al. (1996), "Iterative pre-stack depth migration with velocity analysis," *Terrestrial, Atmospheric & Oceanic Sciences* 7(2), pp. 149-158.

van Groenestijn, G.J.A. et al. (2009), "Estimating primaries by sparse inversion and application to near-offset reconstruction," *Geophyhsics* 74(3), pp. A23-A28.

Verschuur, D.J. et al. (1992), "Adaptive surface-related multiple elimination," *Geophysics* 57(9), pp. 1166-1177.

Verschuur, D.J. (1989), "Wavelet Estimation by Prestack Multiple Elimination," *SEG Expanded Abstracts* 8, pp. 1129-1132.

Wang, Y. (2007), "Multiple prediction through inversion: Theoretical advancements and real data application," *Geophysics* 72(2), pp. V33-V39.

Wang, K. et al. (2009), "Simultaneous full-waveform inversion for source wavelet and earth model," SEG Int'l. Expo. & Ann. Meeting, *Expanded Abstracts*, pp. 2537-2541.

Wu R-S. et al. (2006), "Directional illumination analysis using beamlet decomposition and propagation," *Geophysics* 71(4), pp. S147-S159.

Abt, D.L. et al. (2010), "North American lithospheric discontinuity structured imaged by Ps and Sp receiver functions", *J. Geophys. Res.*, 24 pgs.

Akerberg, P., et al. (2008), "Simultaneous source separation by sparse radon transform," 78th Annual International Meeting, SEG, Expanded Abstracts, pp. 2801-2805.

Aki, K. et al. (1980), "Quantitative Seismology: Theory and Methods vol. I—Chapter 7—Surface Waves in a Vertically Heterogenous Medium," W.H. Freeman and Co., pp. 259-318.

Aki, K. et al. (1980), "Quantitative Seismology: Theory and Methods vol. I," W.H. Freeman and Co., p. 173.

Beasley, C. (2008), "A new look at marine simultaneous sources," *The Leading Edge* 27(7), pp. 914-917.

Beylkin, G. (1985), "Imaging of discontinuities in the inverse scattering problem by inversion of a causal generalized Radon transform," *J. Math. Phys.* 26, pp. 99-108.

Beaty, K.S. et al. (2003), "Repeatability of multimode Rayleigh-wave dispersion studies," *Geophysics* 68(3), pp. 782-790.

Beaty, K.S. et al. (2002), "Simulated annealing inversion of multimode Rayleigh wave dispersion waves for geological structure," *Geophys. J. Int.* 151, pp. 622-631.

Becquey, M. et al. (2002), "Pseudo-Random Coded Simultaneous Vibroseismics," SEG Int'l. Exposition and 72th Annl. Mtg., 4 pgs.

Berkhout, A.J. (1987), "Applied Seismic Wave Theory," Elsevier Science Publishers, p. 142.

Berkhout, A.J. (1992), "Areal shot record technology," *Journal of Seismic Exploration* 1, pp. 251-264.

Berkhout, A.J. (2008), "Changing the mindset in seismic data acquisition," *The Leading Edge* 27(7), pp. 924-938.

Ben-Hadj-Ali, H. et al. (2009), "Three-dimensional frequency-domain full waveform inversion with phase encoding," SEG Expanded abstracts, pp. 2288-2292.

Bonomi, E. et al. (2006), "Wavefield Migration plus Monte Carlo Imaging of 3D Prestack Seismic Data," *Geophysical Prospecting* 54, pp. 505-514.

Bunks, C., et al. (1995), "Multiscale seismic waveform inversion," *Geophysics* 60, pp. 1457-1473.

Chavent, G. et al. (1999), "An optimal true-amplitude least-squares prestack depth-migration operator," *Geophysics* 64(2), pp. 508-515.

Clapp, R.G. (2009), "Reverse time migration with random boundaries," SEG International Exposition and Meeting, Expanded Abstracts, pp. 2809-2813.

Dziewonski A. et al. (1981), "Preliminary Reference Earth Model", *Phys. Earth Planet. Int.* 25(4), pp. 297-356.

Ernst, F.E. et al. (2000), "Tomography of dispersive media," *J. Acoust. Soc. Am* 108(1), pp. 105-116.

Ernst, F.E. et al. (2002), "Removal of scattered guided waves from seismic data," *Geophysics* 67(4), pp. 1240-1248.

Esmersoy, C. (1990), "Inversion of P and SV waves from multicomponent offset vertical seismic profiles", *Geophysics* 55(1), pp. 39-50.

Fallat, M.R. et al. (1999), "Geoacoustic inversion via local, global, and hybrid algorithms," *Journal of the Acoustical Society of America* 105, pp. 3219-3230.

Fichtner, A. et al. (2006), "The adjoint method in seismology I. Theory," *Physics of the Earth and Planetary Interiors* 157, pp. 86-104.

Forbriger, T. (2003), "Inversion of shallow-seismic wavefields: I. Wavefield transformation," *Geophys. J. Int.* 153, pp. 719-734.

Gibson, B. et al. (1984), "Predictive deconvolution and the zero-phase source," *Geophysics* 49(4), pp. 379-397.

Griewank, A. (1992), "Achieving logarithmic growth of temporal and spatial complexity in reverse automatic differentiation," 1 *Optimization Methods and Software*, pp. 35-54.

Griewank, A. (2000), Evaluating Derivatives: Principles and Techniques of Algorithmic Differentiation, Society for Industrial and Applied Mathematics, pp. 131-167.

Griewank, A. et al. (2000), "Algorithm 799: An implementation of checkpointing for the reverse or adjoint mode of computational differentiation," 26 *ACM Transactions on Mathematical Software*, pp. 19-45.

Griewank, A. et al. (1996), "Algorithm 755: A package for the automatic differentiation of algorithms written in C/C++," *ACM Transactions on Mathematical Software* 22(2), pp. 131-167.

Haber, E. et al. (2010), "An effective method for parameter estimation with PDE constraints with multiple right hand sides," Preprint—UBC http://www.math.ubc.ca/~haber/pubs/PdeOptStochV5.pdf.

Herrmann, F.J. (2010), "Randomized dimensionality reduction for full-waveform inversion," *EAGE abstract* G001, EAGE Barcelona meeting, 5 pgs.

Holschneider, J. et al. (2005), "Characterization of dispersive surface waves using continuous wavelet transforms," *Geophys. J. Int.* 163, pp. 463-478.

Ikelle, L.T. (2007), "Coding and decoding: Seismic data modeling, acquisition, and processing," 77th Annual Int'l. Meeting, SEG Expanded Abstracts, pp. 66-70.

Jackson, D.R. et al. (1991), "Phase conjugation in underwater acoustics," *J. Acoust. Soc. Am.* 89(1), pp. 171-181.

Jing, X. et al. (2000), "Encoding multiple shot gathers in prestack migration," *SEG International Exposition and 70th Annual Meeting Expanded Abstracts*, pp. 786-789.

Kennett, B.L.N. (1991), "The removal of free surface interactions from three-component seismograms", *Geophys. J. Int.* 104, pp. 153-163.

Krebs, J.R. (2008), "Full-wavefield seismic inversion using encoded sources," *Geophysics* 74(6), pp. WCC177-WCC188.

Krohn, C.E. (1984), "Geophone ground coupling," *Geophysics* 49(6), pp. 722-731.

Kroode, F.T. et al. (2009), "Wave Equation Based Model Building and Imaging in Complex Settings," OTC 20215, 2009 Offshore Technology Conf., Houston, TX, May 4-7, 2009, 8 pgs.

Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.

Lecomte, I. (2008), "Resolution and illumination analyses in PSDM: A ray-based approach," The Leading Edge, pp. 650-663.

Levanon, N. (1988), "Radar Principles," Chpt. 1, John Whiley & Sons, New York, pp. 1-18.

Liao, Q. et al. (1995), "2.5D full-wavefield viscoacoustic inversion," *Geophysical Prospecting* 43, pp. 1043-1059.

Marcinkovich, C. et al. (2003), "On the implementation of perfectly matched layers in a three-dimensional fourth-order velocity-stress finite difference scheme," *J. of Geophysical Research* 108(B5), 2276.

Griewank, A. (2000), Evaluating Derivatives: Principles and Techniques of Algorithmic Differentiation, Society for Industrial and Applied Mathematics, pp. 121-167.

Maharramov, M. et al. (2007), "Localized image-difference wave-equation tomography," SEG Annual Meeting, *Expanded Abstracts*, pp. 3009-3013.

Meier, M.A. et al. (2009), "Converted wave resolution," Geophysics, 74(2):doi:10.1190/1.3074303, pp. Q1-Q16.

Mora, P. (1987), "Nonlinear two-dimensional elastic inversion of multi-offset seismic data," *Geophysics* 52, pp. 1211-1228.

Nazarian, S. et al. (1983), "Use of spectral analysis of surface waves method for determination of moduli and thickness of pavement systems," *Transport Res. Record* 930, pp. 38-45.

Neelamani, R., (2008), "Simultaneous sourcing without compromise," 70th Annual Int'l Conf. and Exh., EAGE, 5 pgs.

Neelamani, R. (2009), "Efficient seismic forward modeling using simultaneous sources and sparsity," *SEG Expanded Abstracts*, pp. 2107-2111.

Plessix, R.E. et al. (2004), "Frequency-domain finite-difference amplitude preserving migration," *Geophys. J. Int.* 157, pp. 975 987.

Park, C.B. et al. (1999), "Multichannel analysis of surface waves," *Geophysics* 64(3), pp. 800-808.

Park, C.B. et al. (2007), "Multichannel analysis of surface waves (MASW)—active and passive methods," *The Leading Edge*, pp. 60-64.

Porter, R.P. (1989), "Generalized holography with application to inverse scattering and inverse source problems," In E. Wolf, editor, Progress in Optics XXVII, Elsevier, pp. 317-397.

Pratt, R.G. et al. (1998), "Gauss-Newton and full Newton methods in frequency-space seismic waveform inversion," *Geophys. J. Int.* 133, pp. 341 362.

Rayleigh, J.W.S. (1899), "On the transmission of light through an atmosphere containing small particles in suspension, and on the origin of the blue of the sky," *Phil. Mag.* 47, pp. 375-384.

Romero, L.A. et al. (2000), Phase encoding of shot records in prestack migration, *Geophysics* 65, pp. 426-436.

Ryden, N. et al. (2006), "Fast simulated annealing inversion of surface waves on pavement using phase-velocity spectra," *Geophysics* 71(4), pp. R49-R58.

Sheriff, R.E.et al. (1982), "*Exploration Seismology*", pp. 134-135.

Shin, C. et al. (2001), "Waveform inversion using a logarithmic wavefield," *Geophysics* 49, pp. 592-606.

Sirgue, L. (2004), "Efficient waveform inversion and imaging: A strategy for selecting temporal frequencies," *Geophysics* 69, pp. 231-248.

Spitz, S. (2008), "Simultaneous source separation: a prediction-subtraction approach," 78th Annual Int'l. Meeting, *SEG Expanded Abstracts*, pp. 2811-2815.

Stefani, J. (2007), "Acquisition using simultaneous sources," 69th Annual Conf. and Exh., *EAGE Extended Abstracts*, 5 pgs.

Symes, W.W. (2007), Reverse time migration with optimal checkpointing, *Geophysics* 72(5), pp. P.SM213-SM221.

Tarantola, A. (1984), "Inversion of seismic reflection data in the acoustic approximation," *Geophysics* 49, pp. 1259-1266.

Tarantola, A. (1988), "Theoretical background for the inversion of seismic waveforms, including elasticity and attenuation," *Pure and Applied Geophysics* 128, pp. 365-399.

Trantham, E.C. (1994), "Controlled-phase acquisition and processing," *SEG Expanded Abstracts* 13, pp. 890-894.

van Manen, D.J. (2005), "Making wave by time reversal," SEG International Exposition and $75^{th}$ Annual Meeting, *Expanded Abstracts*, pp. 1763-1766.

Weglein, A.B. (2003), "Inverse scattering series and seismic exploration," *Inverse Problems* 19, pp. R27-R83.

Urick, R.J. (1983), "Principles of Underwater Sound, Chapter 9—Reflection and Scattering by Sonar Targets: Target Strength", McGraw-Hill, 39 pgs.

Verschuur, D.J. (2009), Target-oriented, least-squares imaging of blended data, 79th Annual Int'l. Meeting, *SEG Expanded Abstracts*, pp. 2889-2893.

Vigh, D. et al. (2008), "3D prestack plane-wave, full-waveform inversion," *Geophysics* 73(5), pp. VE135-VE144.

Xia, J. et al. (2004), "Utilization of high-frequency Rayleigh waves in near-surface geophysics," *The Leading Edge*, pp. 753-759.

Zhang, Y. (2005), "Delayed-shot 3D depth migration," *Geophysics* 70, pp. E21-E28.

Ziolkowski, A. (1991), "Why don't we measure seismic signatures?," *Geophysics* 56(2), pp. 190-201.

Boonyasiriwat, C. et al. (2010), "3D Multisource Full-Waveform Inversion using Dynamic Random Phase Encoding," SEG Denver 2010 Annual Meeting, pp. 1044-1049.

Boonyasiriwat, C. et al. (2010), "3D Multi-source Least-squares Reverse Time Migration," SEG Denver 2010 Annual Meeting, pp. 3120-3124.

Schuster, G.T. et al. (2010), "Theory of Multisource Crosstalk Reduction by Phase-Encoded Statics," SEG Denver Annual Meeting 2010, pp. 3110-3114.

Baumstein, A. et al. (2009), "Scaling of the Objective Function Gradient for Full Wavefield Inversion," SEG Houston 2009 Int'l. Expo. & Annual Meeting, pp. 2243-2247.

Burstedde, C. et al. (2009), "Algorithmic strategies for full waveform inversion: 1D experiments," *Geophysics* 74(6), pp. WCC37-WCC46.

Lee, S. et al. (2010), "Subsurface parameter estimation in full wavefield inversion and reverse time migration," SEG Denver 2010 Annual Meeting, pp. 1065-1069.

Malmedy, W. et al. (2009), "Approximating Hessians in unconstrained optimization arising from discretized problems," *Computational Optimization and Applications*, pp. 1-16.

Martin, G.S. et al. (2006), "Marmousi2: An elastic upgrade for Marmousi," *The Leading Edge*, pp. 156-166.

Nocedal, J. et al. (2006)a "*Numerical Optimization, Chapt. 7—Large-Scale Unconstrained Optimization*," Springer, New York, $2^{nd}$ Edition, pp. 165-176.

Sheen, D-H. et al. (2006), "Time domain Gauss-Newton seismic waveform inversion in elastic media," *Geophysics J. Int.* 167, pp. 1373-1384.

Tarantola, A. (1986), "A strategy for nonlinear elastic inversion of seismic reflection data," *Geophysics* 51(10), pp. 1893-1903.

Tarantola, A. (2005), "Inverse Problem Theory and Methods for Model Parameter Estimation," *SIAM*, p. 79.

\* cited by examiner

FULL WAVEFIELD INVERSION USING TIME VARYING FILTERS

CROSS-REFERENCE TO RELATED APPLICATION

This application claims the benefit of U.S. Provisional Patent Application 61/318,561, filed Mar. 29, 2010, entitled FULL WAVEFIELD INVERSION USING TIME VARYING FILTERS, the entirety of which is incorporated by reference herein.

FIELD OF THE INVENTION

The invention relates generally to the field of numerical inversion of seismic data to infer elastic parameters of the propagating medium. More particularly, the invention is a method for reducing the accuracy requirements on the starting model when performing local objective function optimization in inversions such as seismic data inversion.

BACKGROUND OF THE INVENTION

Inversion [see, for example, Tarantola, 1984] attempts to find a model that optimally explains observed data. Local inversion methods that minimize the value of an objective function that measures the difference between simulated and observed data, are often the only practical means of solving an inversion problem for a model having a large number of free parameters. These local methods require an initial guess for the model to be inverted. They then iteratively update the model to make it closer to the true solution by searching for a perturbation of the current model in a direction based on the gradient of the objective function. Unfortunately, the objective function often has many minima, not just one minimum corresponding to the solution model. These other minima are called local minima, while the minimum corresponding to the desired solution is termed the global minimum. If the starting model for inversion is too close to the model corresponding to one of these local minima, then local inversion methods will get stuck near that local minimum and never iterate away from it to the global minimum. Thus, the wrong solution is produced no matter how much effort is expended on iteration.

This local minima problem can be solved by first iterating inversion on an altered objective function that has fewer local minima, but has a global minimum near the location of the desired solution. The result of iterating on this altered objective function should produce a model closer to the desired solution. This more accurate model is then used as the initial model for iteration on the original objective function. Since this new initial model is close to the global minimum of the original objective function, iteration on the original objective function should now produce an accurate solution. This technique of iterating on an altered objective function is often termed multi-resolution, or multi-grid, or multi-scale inversion, which is discussed further below.

There are a large number of well known methods of inversion. These methods fall into one of two categories, iterative inversion and non-iterative inversion. The following are definitions of what is commonly meant by each of the two categories:

Non-iterative inversion—inversion that is accomplished by assuming some simple background model and updating the model based on the input data. This method does not use the updated model as input to another step of inversion. For the case of seismic data these methods are commonly referred to as imaging, migration, diffraction tomography, linear inversion, or Born inversion.

Iterative inversion—inversion involving repetitious improvement of the subsurface properties model such that a model is found that satisfactorily explains the observed data. If the inversion converges, then the final model will better explain the observed data and will more closely approximate the actual subsurface properties. Iterative inversion usually produces a more accurate model than non-iterative inversion, but is much more expensive to compute.

Wave inversion means any inversion based on a wave simulator, such as acoustic or seismic inversion. The iterative method most commonly employed in wave inversion is objective function optimization. Objective function optimization involves iterative minimization of the value, with respect to the model M, of an objective function S(M) which is a measure of the misfit between the calculated and observed data (this is also sometimes referred to as the cost function). The calculated data are simulated with a computer programmed to use the physics governing propagation of the source signal in a medium represented by the current model. The simulation computations may be done by any of several numerical methods including but not limited to finite differences, finite elements or ray tracing. Following Tarantola [Tarantola, 1984], the most commonly employed objective function is the least squares objective function:

$$S(M)=(u(M)-d)^T C^{-1}(u(M)-d), \qquad (1)$$

where T represent the vector transpose operator and:
M=the model which is a vector of N parameters $[m_1, m_2, \ldots, m_N]^T$,
d=measured data vector (sampled with respect to source, receiver and time),
u(M)=simulated data vector for model M (sampled with respect to source, receiver and time),
C=the covariance matrix.

Objective function optimization methods are either local or global [Fallat, et al., 1999]. Global methods simply involve computing the objective function S(M) for a population of models $\{M_1, M_2, M_3, \ldots\}$ and selecting a set of one or more models from that population that approximately minimize S(M). If further improvement is desired this newly selected set of models can then be used as a basis to generate a new population of models that can be again tested relative to the objective function S(M). Global methods are more likely to converge to the correct solution than local methods, but are too expensive to apply to large scale inversion problems having many model parameters. Well known global inversion methods include Monte Carlo, simulated annealing, genetic and evolution algorithms.

Local objective function optimization involves:

---

Algorithm 1 - Algorithm updating a model using local objective function optimization.

1. Set the current model to be the starting model,
2. Compute the gradient, $\nabla_M S(M)$, of the objective function with respect to the parameters that describe the model,
3. Search for an updated model, that is a perturbation of the starting model in a direction based on the gradient, that better explains the observed data.
4. If updated model is not sufficiently accurate then return to step 2 using the updated model as the current model, otherwise terminate.

Local inversion methods are much more efficient than global methods, and are therefore the only practical methods to apply to a large scale inversion problem. Commonly used local objective function inversion methods include steepest descent, conjugate gradients and Newton's method.

It should be noted that computation of $\nabla_M S(M)$, the second step Algorithm 1, requires computation of the derivative of S(M) with respect to each of the N model parameters $m_j$. When N is very large (roughly more than a thousand), this computation can be extremely time consuming if it had to be performed for each individual model parameter. Fortunately, the adjoint method can be used to efficiently perform this computation for all model parameters at once [Tarantola, 1984]. The adjoint method for the least squares objective function and a gridded model parameterization (M is a vector with each element representing the model's value in a grid cell) is summarized by the following algorithm:

1. Compute forward simulation of the data using the current model, $M^{(k)}$ with k being the current iteration, to get $u(M^{(k)})$,
2. Subtract the observed data from the simulated data giving $\delta(M^{(k)})$,
3. Compute the reverse simulation (i.e. backwards in time) using $C^{-1} \delta(M^{(k)})$ as the source, producing $u_{adjoint}(M^{(k)})$,
4. Finally, $\nabla_M S(M^{(k)}) = u_{adjoint}^T(M^{(k)}) A\, u(M^{(k)})$, where A represents the adjoint operator (e.g. identity for gradients with respect to components of M representing bulk modulus, or spatial gradient for gradients with respect to components of M representing density).

Algorithm 2—Algorithm for computing the least-squares cost-function gradient of a gridded model using the adjoint method.

Local objective function optimization is generally much less expensive than global objective function optimization, but requires a more accurate starting model. This more accurate starting model is required, because the objective function often has many minima and local optimization methods will generally find the closest of these minima. The minimum corresponding to the true model is called the global minimum and all other minima are termed local minima. If the starting model is not nearest to the global minimum then a local optimization technique will likely yield an inaccurate inverted model that corresponds to the closest local minimum. This is illustrated in FIG. 1 where the objective is to invert for a model M which has two parameters $m_1$ and $m_2$. The dashed contours 110 display the values of the objective function as a function of the parameters $m_1$ and $m_2$. The global minimum 120 is marked by a solid black circle and two local minima 130 and 140 are shown by gray filled circles. The inversion starts at initial model $M^{(0)}$ (150) and proceeds by local optimization to the iteration one model $M^{(1)}$ and so forth to model $M^{(3)}$ (160). No matter how many more iterations of local optimization are attempted the inverted model will only get closer to the local minimum 130 near $M^{(3)}$, rather than approximating the global minimum 120.

Several methods have been proposed that attempt to overcome this local minima problem. As mentioned above, many of these methods involve iterating on an altered objective function during the early iterations of the inversion. This altered objective function is chosen to have fewer local minima, but to have a global minimum near the original objective function's global minimum. By this means, the early iterations will produce a model that though inaccurate, is significantly closer to the original objective function's global minimum. FIG. 2 illustrates a local optimization corresponding to FIG. 1 but using an altered objective function having fewer local minima. The altered objective function has a global minimum 210 (the solid black circle) that is close to but not at the same location as the global minimum 220 for the original objective function (the cross-hatched circle). Starting from the initial model $M^{(0)}$ (230), which is the same as the initial model used in FIG. 1, two iterations using the altered objective function results in a model $M^{(2)}$ (240). This model $M^{(2)}$ can then be used as the initial model for further iterations but now using the original objective function. This is illustrated in FIG. 3 where the iteration 2 model from FIG. 2 (shown in gray), renumbered 310, is used as the starting model. Iteration now converges to a model $M^{(4)}$ (320) near the global minimum 220 rather than near a local minimum as in FIG. 1. Because the starting model is more accurate than the original starting model, the inversion now iterates to the correct solution.

Typically when altering the original objective function, the number of local minima in the altered objective function is inversely related to the distance between the global minima of the original and that of the altered objective function. Thus, it can be advantageous to iterate on a sequence of altered objective functions starting with one having the fewest number of local minima and least accurate global minimum, proceeding through objective functions that have increasing numbers of local minima and increasing accuracy of the global minim, then ending by iterating on the original objective function. Methods that perform initial iterations on altered objective functions having few local minima are often referred to as multi-scale or multi-grid methods, and a flow chart for this technique is illustrated in FIG. 4.

The process starts at step 410 by choosing an alteration of the original objective function to optimize. This altered objective function, which depends on the data to be fit 420, is iterated at step 430 until the altered objective function is found to be sufficiently minimized at step 440. (The value is less than a selected maximum or another stopping condition is met.) When that occurs, it is determined at step 450 whether the current inverted model sufficiently minimizes the original objective function. If not, the process returns to step 410 and either choose a new altered objective function or the original objective function to optimize. Eventually, the process ends (460).

Two altered objective functions have been proposed in the literature for solving the local minima problem in seismic full wave field inversion ("FWI"):

High cut filters—Bunks (Bunks et al., 1995) describes altering the least squares objective function by applying time invariant high-cut filters (sometimes called a low-pass filter, meaning a filter that passes frequencies below its cutoff frequency and rejects frequencies above it) to both the measured data and the source signature used for computing the simulated seismic data. The high-cut, i.e. cutoff, frequency of these filters is then increased as the inversion is iterated, with no filter being applied for the final iterations (no filter corresponding to the original objective function). It is well known how to design such filters; see, for example, Press et al., *Numerical Recipes in FORTRAN, The Art of Scientific Computing*, Cambridge University Press (1992). They may also be obtained from sources such as Seismic Un*x (see http://www.cwp.mines.edu/cwpcodes/).

Layer stripping—Maharramov (Maharramov et al., 2007) teaches that initial iterations of inversion should be localized to shallow layers, and that this depth range be extended as iteration proceeds. Correspondingly, when only shallow depths are inverted, then only shorter times in the data are inverted, because a shallow model can only predict the shorter time portions of the data.

In general FWI will converge to the global minimum if the starting model is accurate enough to predict traveltimes for any propagation mode to within a half period of that mode. This may be called Pratt's criterion. ("In practice, with seismic waveform inversion this implies that much of the waveform energy must be predicted (by the initial model) to within a half-wavelength of the observed waveforms; if not, a minimum misfit model will be obtained when the predicted waveforms match the wrong cycle in the observed waveforms."— Pratt, 1999).

The present invention is an improved method for reducing the accuracy requirements on the starting model when performing local objective function optimization.

SUMMARY OF THE INVENTION

The present inventive method is applicable to any inversion based on a wave simulator, such as acoustic or seismic inversion. In one of its aspects, the invention is a specific method for altering the objective function which will, for a given inaccuracy in the starting model, reduce the number of iterations needed to find the global minimum. Reducing the number of iterations will correspondingly reduce cost and compute time. The alteration comprises incorporating a time varying filter into the objective function. This filter is chosen so that some statistical measure of the traveltime difference between the measured and computed data is less than some fraction (usually one quarter) of the dominant period of the data. This implies that the filter be a high-cut filter. The filter is further chosen such that the high-cut frequency of this filter decreases with increasing traveltime, making it a time-varying filter.

With reference to the flow chart of FIG. 6, in one embodiment the invention is a method for inverting measured seismic data (65) to infer a physical property model of a subsurface region, comprising successively updating the model by performing iterative, multi-scale inversion of the measured seismic data using local-minimum optimization (64) of an objective function that computes misfit between model-simulated seismic data and the measured seismic data (61), wherein a changing low-pass filter is used to successively alter the objective function from scale to scale by filtering the measured and simulated seismic data in the misfit computation (62), said filter being time-varying wherein the filter's low-pass cutoff frequency varies with traveltime of the seismic data being filtered at one or more scales of the inversion. The filter may be designed using Pratt's criterion for reducing the number of local minima, modified to involve a statistical measure (such as the mean) of the data with respect to source and receiver location but not with respect to traveltime, leaving the filter time-varying (63). The final stage of the multi-scale inversion, preferably using the unaltered objective function, is thus more efficiently provided with a more accurate starting model to help it converge to a global minimum, resulting in an optimized physical properties model (66).

As with any data inversion, the process in practical applications is highly automated, i.e. is performed with the aid of a computer programmed in accordance with the disclosures herein.

BRIEF DESCRIPTION OF THE DRAWINGS

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Figure 1:
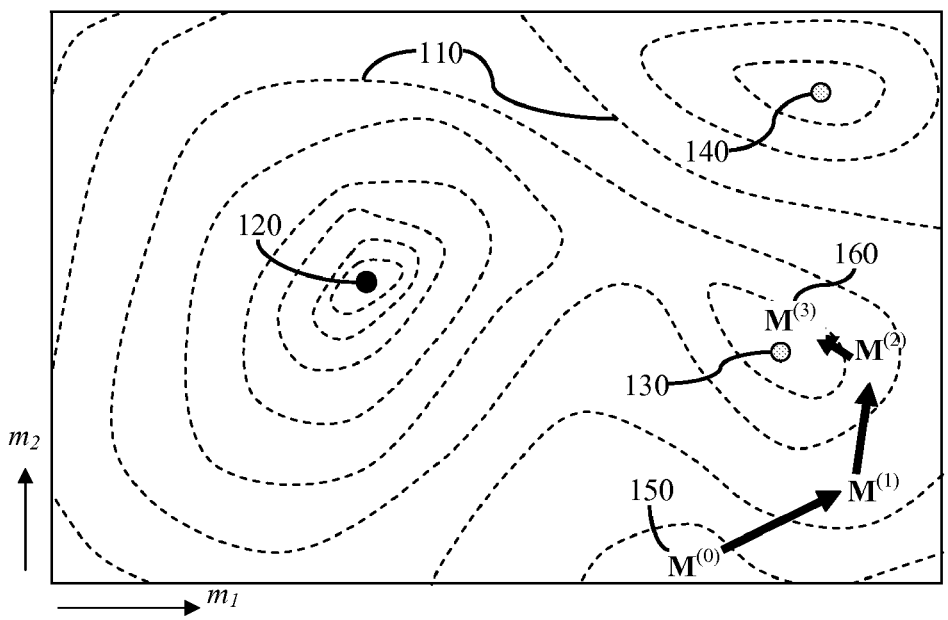
FIG. 1 is a schematic illustration of an inversion converging to a local minimum.
Figure 2:
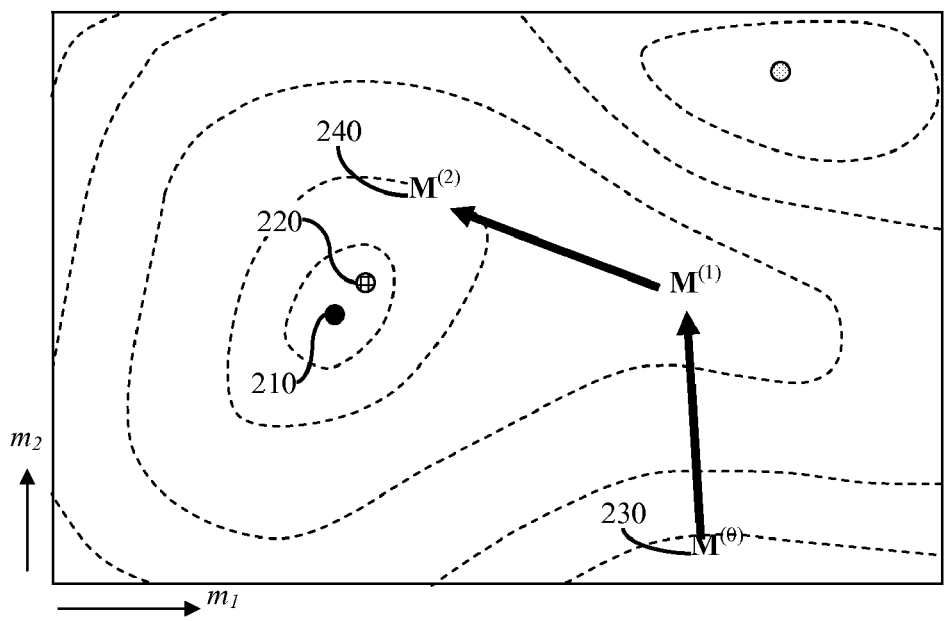
FIG. 2 is a schematic diagram of local optimization corresponding to FIG. 1 but using an altered objective function having fewer local minima.
Figure 3:
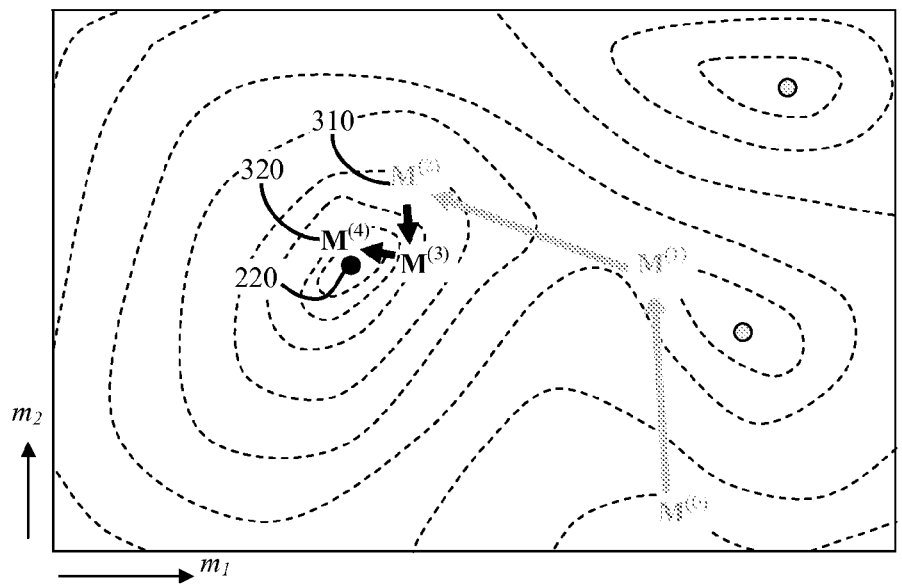
FIG. 3 illustrates local optimization with the original objective function from FIG. 1 but using the iteration 2 model from FIG. 2 (shown in gray) as the starting model.
Figure 4:
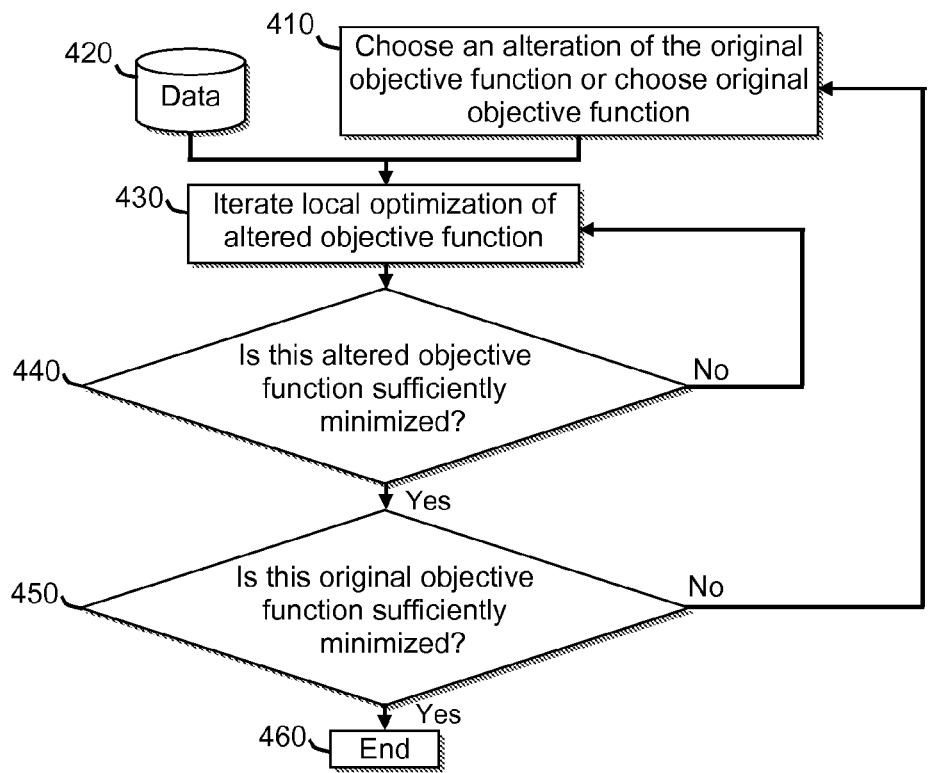
FIG. 4 is a flow chart showing basic steps in multi-scale optimization.
Figure 5:
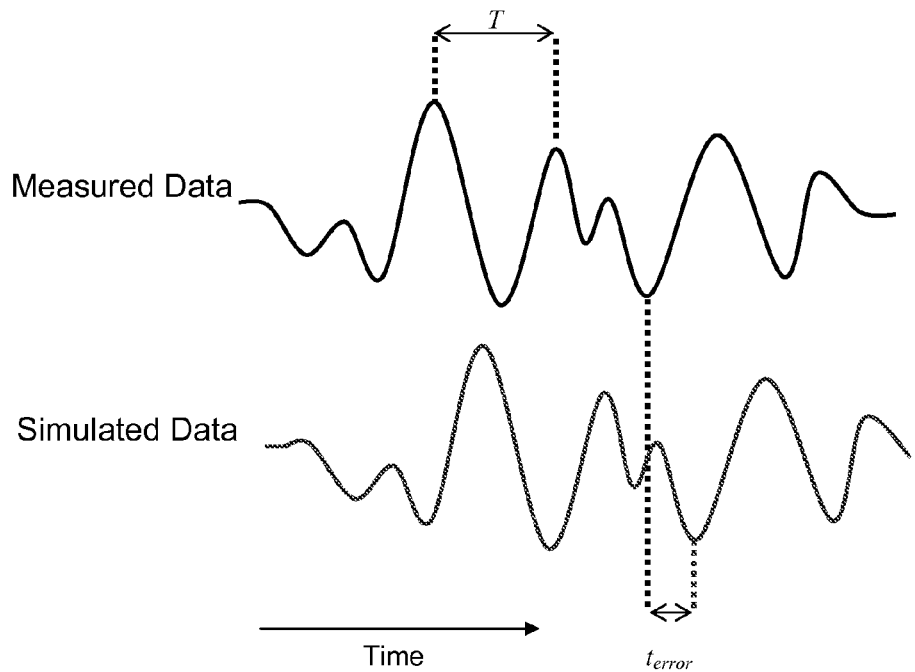
FIG. 5 is a schematic diagram illustrating the traveltime error, $t_{error}$, between the measured and simulated data, and the instantaneous period, T, of a seismic trace.
Figure 6:
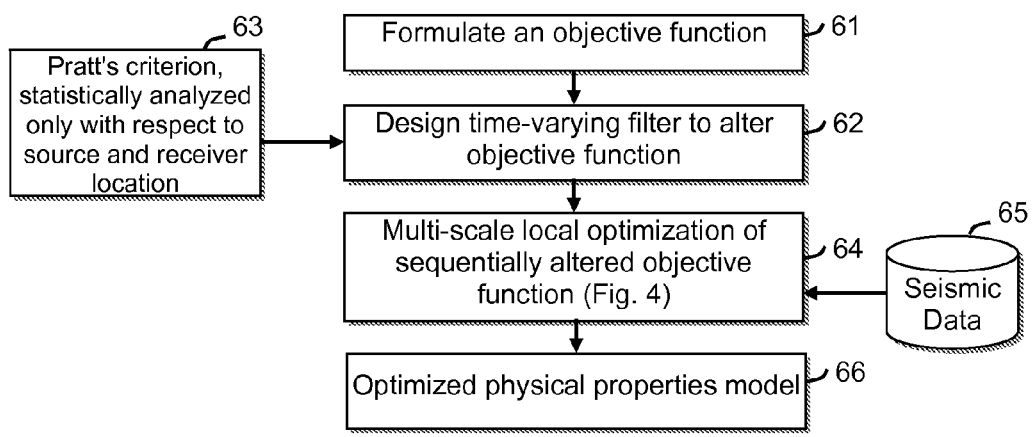
FIG. 6 is a flow chart showing basic steps in one embodiment of the present invention.

Mathematically, Pratt's criterion can be stated as:

$$\frac{\max_{s,r,t}|t_{error}(M,s,r,t)|}{\max_{s,r,t}T(s,r,t)} \leq \frac{1}{2}, \quad (2)$$

where $t_{error}$ is the traveltime error between the measured and simulated data, and T is the instantaneous period of the measured data as illustrated in FIG. 5. In FIG. 5, the traveltime error between the measured and simulated data is indicated as $t_{error}$, and the instantaneous period of a seismic trace is indicated by T. The traveltime error is the amount of time shift needed align the measured and simulated data. The instantaneous period is the time between similar phases (e.g. peaks or troughs) of the data. (Traveltime means the elapsed time from generation of a seismic wave by the seismic source until the wave is recorded at a receiver.)

Both the traveltime error and instantaneous period are functions of the source s, the receiver r and the traveltime t. In addition $t_{error}$ is a function of the accuracy of the current model M. In practice Equation 2 may be more restrictive than necessary to ensure convergence of FWI. In particular a less rigid statistical measure than the maximum (e.g., the mean) could be used or a target other than ½ could be used on the right side of the inequality. Thus, in practice, Equation 2 can be replaced by the following:

$$\frac{\text{stat}_{s,r,t}|t_{error}(M,s,r,t)|}{\text{stat}_{s,r,t}T(s,r,t)} \leq \frac{\alpha}{2}, \quad (3)$$

where stat is some statistic such as the mean, mode or mean squared error, and α is a constant that is approximately equal to one. It is not expected that the results will be very sensitive to the choice of statistic.

Bunks's alteration of the objective function follows a line of reasoning similar to Pratt's criterion by using a high-cut filter to increase T(s,r,t) thus allowing larger values of $t_{error}$. It is understood that a main cause of local minima is cycle skipping, and longer periods make this less likely. In theory, $t_{error}$ could be reduced instead of limiting the data to lower frequency; however the only way to do this would be to have a more accurate starting model, which is very difficult and maybe impossible. Furthermore the goal of FWI is to produce a more accurate model, so requiring a very accurate starting model reduces the value of FWI. On the other hand Maharramov's layer stripping method avoids large traveltime errors by inverting only a shallow model that propagates only modes that have small traveltimes. Since traveltime errors usually increase with traveltime, limiting the inversion to shorter traveltimes keeps $t_{error}$ within the rule of thumb.

In the present invention, an alternative is proposed to Equation 3's "rule of thumb" that will lead to a new strategy for ensuring convergence. The alternative rule of thumb is as follows:

$$\frac{\mathop{stat}\limits_{s,r}|t_{error}(M, s, r, t)|}{\mathop{statT}\limits_{s,r}(s, r, t)} \leq \frac{\alpha}{2}. \quad (4)$$

This rule of thumb differs from Equation 3 in that the statistical analysis is no longer performed with respect to time. After applying the statistical calculations, the numerator and denominator on the left side of Equation 4 are not functions of the source and receiver locations. Equation 4 is equivalent to:

$$\hat{T}(t) \geq \frac{2}{\alpha}\hat{t}_{error}(M, t), \quad (5)$$

where $$\hat{T}(t) = \mathop{statT}\limits_{s,r}(s, r, t),$$

and $$\hat{t}_{error}(M, t) = \mathop{stat}\limits_{s,r}|t_{error}(M, s, r, t)|.$$

In practice $\hat{t}_{error}$ is an increasing function of traveltime t, because traveltime errors tend to accumulate as waves propagate through an inaccurate model. Equation 5 suggests that the optimal strategy for multi-scale inversion would be to alter the measured and simulated data so that the average instantaneous period of the seismic data increases with traveltime in a manner similar to $\hat{t}_{error}$. This can be accomplished by applying a time-varying high-cut filter to the measured data. The high-cut frequency of this time varying filter should decrease with increasing traveltime. The advantage of this approach over the Bunks technique is that more information (i.e. higher frequency information at small traveltimes) would be used for the early iterations of inversion, thus better constraining the inverted model leading to faster convergence. The advantage of our proposal relative to Maharramov's layer stripping is again that more of the data (i.e. seismic modes propagating through deeper portions of the model) would be used in early iterations, leading to faster convergence.

The function $\hat{t}_{error}$ depends on both how traveltime errors are measured and also on what statistical measure is applied to these traveltime error measurements. However, it may be expected that this proposed multi-scale inversion strategy will not be strongly sensitive to $\hat{t}_{error}$. In fact, rather than put significant effort into measuring $\hat{t}_{error}$ from the data an alternative strategy would be to assume a simple functional form for $\hat{t}_{error}$, such as the linear function $\hat{t}_{error}=\beta(M_0)t$ where $M_0$ is the initial model. This assumed functional form would then be used to design a time-varying high-cut filter satisfying Equation 5, and inversion using this filter would be attempted. If the inversion does not converge then the value of $\beta$ would be increased and inversion with this more conservative estimate of $\hat{t}_{error}$ would be attempted. This testing would continue until a $\beta$ is found that yields convergence for the initial model.

After finding a $\beta$ that converges for the initial model, $M_0$, then iteration will produce a current inverted model which is more accurate than the initial model. This increased accuracy implies that $\beta$ should be reduced as iteration proceeds. This decrease in $\beta$ implies a corresponding time-varying filter that passes higher frequencies. The inversion proceeds with time-varying filters that pass more and more high frequencies, until all frequencies in the data are used in the final iterations of inversion.

To make practical use of time-varying filters in inversion, it is necessary to be able to compute the adjoint gradient (Algorithm 2) in a manner consistent with the time varying filter. The mathematically most straight forward way of doing this is to implement the time varying filter using the inverse covariance matrix $C^{-1}$ in Equation 1. To do this, the inverse covariance matrix $C^{-1}$ would be chosen to be non-diagonal (in the time dimension), with elements equal to a temporal representation of the time varying filter coefficients. Since the filter would be time varying, the filter coefficients vary with time. Example 1 shows an example sub-matrix of $C^{-1}$, corresponding to a particular source and receiver, that implements a time-varying filter. The first row of this sub-matrix is zero, excepting a one on the diagonal.

$$\text{time} \downarrow \begin{pmatrix} 1 & 0 & 0 & 0 & 0 & 0 & 0 & 0 & 0 & 0 \\ 0 & .95 & .05 & 0 & 0 & 0 & 0 & 0 & 0 & 0 \\ 0 & 0 & .90 & .10 & .05 & 0 & 0 & 0 & 0 & 0 \\ 0 & 0 & 0 & .85 & .15 & .10 & .05 & 0 & 0 & 0 \\ 0 & 0 & 0 & 0 & .80 & .20 & .15 & .10 & .05 & 0 \\ 0 & 0 & 0 & 0 & 0 & .75 & .25 & .20 & .15 & .10 \\ 0 & 0 & 0 & 0 & 0 & 0 & .70 & .30 & .25 & .20 \\ 0 & 0 & 0 & 0 & 0 & 0 & 0 & .65 & .35 & .30 \\ 0 & 0 & 0 & 0 & 0 & 0 & 0 & 0 & .60 & .40 \\ 0 & 0 & 0 & 0 & 0 & 0 & 0 & 0 & 0 & .55 \end{pmatrix}$$

time →

Example 1

This implies that this particular time varying filter performs no filtering at time zero. The off-diagonal elements increase for increasing rows in the sub-matrix, implying that the high cut frequency of this time varying filter decreases with increasing time. Notice that the traveltime error could be viewed as functions of the source or receiver. In this case, this method could be applied in a more general manner than just a simple time varying filter. For example:

1. The traveltime error is often not just a function of traveltime, but is also often a function of the offset between the source and the receiver. If this is the case, it would be advantageous to use different time-varying filters for different source receiver offsets. As iteration proceeds the filter would be relaxed as the accuracy of the model increases.
2. The traveltime error is often a function of the time dip of the data in the source and/or receiver domain. This can happen because steep time dips correspond to waves traveling in predominantly horizontal direction which are more sensitive to the accuracy of the initial model. In this case, time-varying dip-filters (e.g. a frequency-wavenumber filter that removes seismic events having high time dip) could be used in place of time-varying temporal-filters. As iteration proceeds the dip-filter would be relaxed as the accuracy of the model increases.

In any case the filter (e.g. a space- and time-varying filter, a time-varying dip-filter etc.), can be implemented in the covariance matrix $C^{-1}$ as explained above, and the computation of the gradient then also proceeds as described above.

A preferred approach might be that if $\hat{t}_{error}$ (M,t) can be estimated for the current model M, then the time varying filter should be designed to be consistent with Equation 5. Otherwise, it is reasonable to estimate that $\hat{t}_{error}$ (M,t) is a linear function βt, using an initial guess for the value of β. Again the time varying filter should be designed to be consistent with both this estimate of β and Equation 5. If this inversion converges then the process is completed. If the inversion does not converge, then β would be increased and another inversion would be attempted. This process of increasing β would continue until convergence is achieved.

In practice the matrix $C^{-1}$ representing the time varying filter would be very sparse, and therefore its application to the data residual in step 3 of algorithm 2 would best be accomplished by application of a time varying filter operator rather than by matrix multiplication. In fact this method of inversion is probably not strongly sensitive to the method used to implement the time varying filter. Therefore, time varying filter could be most efficiently implemented as a windowed time invariant filter. In other words, the data would be separated into time windows, and then different time invariant filters would be applied to the different windows.

The foregoing description is directed to particular embodiments of the present invention for the purpose of illustrating it. It will be apparent, however, to one skilled in the art, that many modifications and variations to the embodiments described herein are possible. For example, the inventive method is not limited to seismic data, and can be applied to any data where multiscale inversion is used to avoid local minima All such modifications and variations are intended to be within the scope of the present invention, as defined by the appended claims.

REFERENCES

Bunks, C., F. M. Saleck, S. Zaleski, G. Chaven, 1995, "Multiscale seismic waveform inversion," Geophysics, 60, pp. 1457-1473.
Maharramov, M., U. Albertin, 2007, "Localized image-difference wave-equation tomography," SEG Annual Meeting Expanded Abstracts, San Antonio, 2007, pp. 3009-3013.
Fallat, M. R., Dosso, S. E., "Geoacoustic inversion via local, global, and hybrid algorithms," *Journal of the Acoustical Society of America* 105, pp. 219-3230 (1999).
Pratt, R. G., "Seismic waveform inversion in the frequency domain, Part 1: Theory and verification in a physical scale model," *Geophysics* 64, pp. 888-901 (1999).
Tarantola, A., "Inversion of seismic reflection data in the acoustic approximation," *Geophysics* 49, pp. 1259-1266 (1984).

The invention claimed is:

1. A method for inverting measured seismic data to infer a physical property model of a subsurface region, comprising successively updating the model by performing iterative, multi-scale inversion of the measured seismic data on a computer using local-minimum optimization of an objective function that computes misfit between model-simulated seismic data and the measured seismic data, wherein a changing low-pass filter, hereinafter called the filter, is used to successively alter the objective function from scale to scale by filtering the measured and simulated seismic data in the misfit computation, said filter being time-varying wherein the filter's low-pass cutoff frequency varies with traveltime of the seismic data being filtered at one or more scales of the inversion.

2. The method of claim 1, wherein the filter's low-pass cutoff frequency decreases with increasing traveltime.

3. The method of claim 1, wherein each successively altered objective function corresponds to the filter being changed to reject less data.

4. The method of claim 3, wherein the objective function is successively altered until a final scale is reached at which the objective function is unaltered and wherein iteration continues until a convergence criterion is satisfied or other stopping condition is met.

5. The method of claim 4, wherein the filter corresponding to the final scale passes all data and rejects none.

6. The method of claim 3, wherein the filter is changed to reject less data by increasing the filter's low-pass cutoff frequency.

7. The method of claim 1, wherein one or more iterations are performed at each scale of the multi-scale inversion, i.e. for each change of the high-pass filter and alteration of the objective function.

8. The method of claim 1, wherein the local-minimum optimization of the objective function comprises computing the gradient of the objective function with respect to one or more parameters of a current physical property model, then searching for an updated physical property model, that is a perturbation of the current physical property model in a direction based on the gradient that better explains the measured seismic data.

9. The method of claim 8, wherein the gradient is computed by an adjoint method.

10. The method of claim 9, therein the inversion is full wavefield inversion.

11. The method of claim 2, wherein to ensure that the iterations converge to a global minimum of the objective function, the following criterion is used to design a time-varying low-pass filter: the model when iteration begins should be accurate enough to predict traveltimes for any propagation mode to within a half period of that mode after the time varying filter is applied.

12. The method of claim 11, wherein said convergence criterion may be mathematically expressed as:

$$\frac{\underset{s,r}{stat}|t_{error}(M, s, r, t)|}{\underset{s,r}{stat}T(s, r, t)} \leq \frac{\alpha}{2}$$

where M represents the physical property model, $t_{error}$ is traveltime error between the measured and simulated seismic data, T is the measured data's instantaneous period, α is a selected constant, t is seismic wave traveltime, s represents seismic source coordinates, r represents seismic receiver coordinates, and stat means mean or average or another measure to reduce variability of s and r to constants.

13. The method of claim 12, wherein α is a number within the range ½ to 1.

14. The method of claim 12, where rate of decrease of the low-pass cutoff frequency with increasing traveltime is determined consistent with the convergence criterion.

15. The method of claim 1, further comprising using different time-varying filters for different source-receiver offsets.

16. The method of claim 9, wherein the filter is implemented using the inverse covariance matrix $C^{-1}$ in Equation 1.

17. The method of claim 16, wherein the inverse covariance matrix $C^{-1}$ is chosen to be non-diagonal in the time dimension, with elements equal to a temporal representation of the time varying filter's coefficients, said coefficients varying with time.

18. The method of claim 12, wherein $\hat{t}_{error} = _{s,r}^{stat}|t_{error}(M, s, r, t)|$ is assumed to be linear function of traveltime of the form $\hat{t}_{error} = \beta(M_0)t$, where $M_0$ is an initial choice for the model when iteration begins, and $\beta$ is a selected constant, wherein if the iterative inversion does not converge using this filter design, then the value of $\beta$ would be increased and inversion with this more conservative estimate of $\hat{t}_{error}$ would be attempted, and so on until a $\beta$ is found that yields convergence for the initial model.

19. The method of claim 1, wherein the inversion is full wavefield inversion.

20. The method of claim 1, wherein a computer is programmed to perform at least some of the method's steps.

21. A computer program product, comprising a computer usable medium having a computer readable program code embodied therein, said computer readable program code adapted to be executed to implement a method for full wavefield inversion of measured data to infer a model of a propagating medium for the wavefield, said method comprising:

successively updating the model by performing iterative, multi-scale inversion of the measured data using local-minimum optimization of an objective function that computes misfit between model-simulated data and the measured data;

wherein a changing low-pass filter, hereinafter called the filter, is used to successively alter the objective function from scale to scale by filtering the measured and simulated data in the misfit computation, said filter being time-varying;

wherein the filter's low-pass cutoff frequency varies with wavefield traveltime through the medium corresponding to the data being filtered at one or more scales of the inversion.

22. The computer program product of claim 21, wherein the filter's low-pass cutoff frequency decreases with increasing traveltime.

23. The computer program product of claim 21, wherein the data being inverted are seismic data, and the propagating medium is a subsurface region of the earth.

* * * * *